Oct. 11, 1960
J. F. JENNINGS ET AL
2,956,070
ORGANIC CHEMICAL REACTIONS INVOLVING LIBERATION OF WATER
Filed April 29, 1958
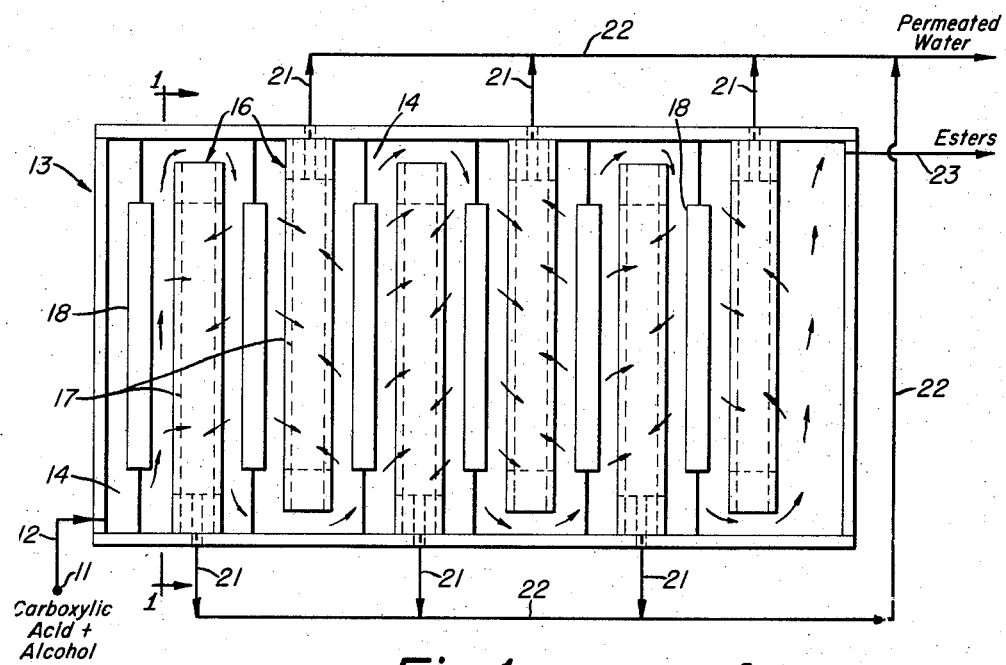
Fig. 1
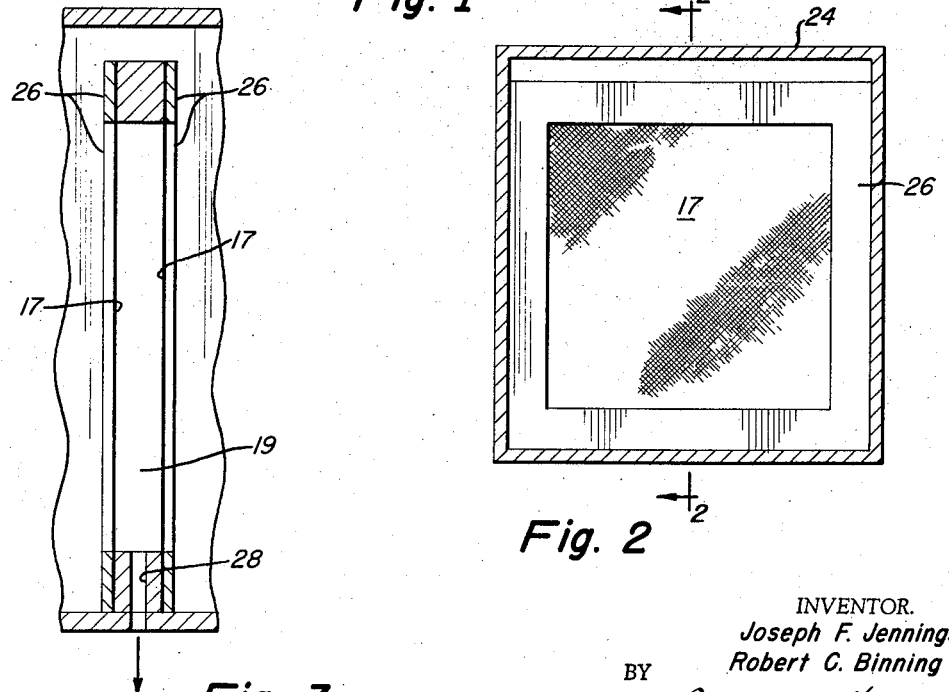
Fig. 2
Fig. 3
INVENTOR.
Joseph F. Jennings
Robert C. Binning
BY
*Joseph C. Kotarski*
ATTORNEY United States Patent Office 2,956,070
Patented Oct. 11, 1960

2,956,070

ORGANIC CHEMICAL REACTIONS INVOLVING LIBERATION OF WATER

Joseph F. Jennings and Robert C. Binning, Texas City, Tex., assignors to The American Oil Company, Texas City, Tex., a corporation of Texas Filed Apr. 29, 1958, Ser. No. 731,743

9 Claims. (Cl. 260—410.9)

The present invention relates to a method for driving chemical reactions to completion, and particularly concerns completing those chemical reactions in which water is evolved as one of the products.

During the course of many chemical reactions there exists in the reaction mixture certain amounts of reaction products and unconverted reactants. If the reaction is allowed to proceed for a length of time sufficient to reach equilibrium, an equilibrium ratio of reaction products and reactants will exist in the reaction mixture. The equilibrium ratio will exist unless the equilibrium is displaced by making use of the law of mass action. The reaction can be driven to substantial completion by removing products from the reaction zone.

An object of the present invention is to provide a method for driving to completion equilibrium reactions of organic chemicals in which water is formed as a reaction product. Another object is to provide a novel permeation process in which a chemical reaction is carried on during the permeation process and within the permeation apparatus. A further object is to provide a novel permeation process in which chemical reactions are effected and driven to substantial completion by selectively removing one of the reaction products from the mixture of reaction products. Other objects and advantages of the invention will be apparent from the detailed description thereof.

In accordance with the present invention organic chemicals, which react to provide an equilibrium composition of unconverted reactants and reaction products where water is one of the reaction products, are introduced into the feed zone of a permeation apparatus. The permeation apparatus is comprised of a feed zone which is separated from a permeate zone by a thin plastic membrane. The permeation membrane is water permeable. The liquid organic chemicals are introduced into the feed zone of the permeation apparatus wherein they are reacted to produce a different organic chemical and water. The permeation apparatus is maintained under permeation conditions, the mixture in the feed zone being preferably maintained in the liquid state. Water, with very little if any organic chemical, permeates through the membrane into the permeate zone. The permeated water is withdrawn from the permeate zone. This latter zone is preferably maintained at a lower pressure than exists in the feed zone and at a pressure such that the water permeating into the permeate zone is vaporized and then rapidly withdrawn from the permeate zone. By permeating the water from the feed zone wherein the organic chemicals are reacting, the reaction is driven to completion whereas it would ordinarily reach equilibrium conditions if the water had not been withdrawn from admixture with the reactants. After the reaction is substantially completed, the non-permeated reaction products are recovered from the feed zone. Chemical reactions in which many varied reactants are employed may be carried out in the feed zone of the permeation apparatus and driven to substantial completion by the process of this invention provided that water is one of the reaction products that is involved in the reversible equilibrium chemical reaction. Thus esterification, formation of thioesters, acetals, mercaptals, mercaptoles, and the formation of oximes by reaction of aldehydes or ketones with hydroxyl amines may be driven to substantial completion.

Figure 1 shows in diagrammatic form a cutaway view of a permeation apparatus and the use thereof in driving an esterification reaction to essential completion.

Figure 2 is a cross-sectional view taken along lines 1—1' of the permeation apparatus of Figure 1 and shows one permeation unit in detail.

Figure 3 is a cross-sectional view taken along lines 2—2' of the permeation cell shown in Figure 2.

Referring to Figure 1, a mixture of a carboxylic acid and alcohol is passed from source 11 by way of line 12 into the interior of permeation vessel 13. In this embodiment a mixture of about 2 mols of isooctyl alcohol per mol of lauric acid is introduced at about 155° C. under pressure through line 12. The interior portion of the permeation vessel 13 into which this mixture is introduced is called the feed zone 14 of the permeation apparatus. Within the permeation vessel are positioned a number of permeation cells 16. These permeation cells have a hollow interior. The cells are completely sealed off from the feed zone 14 and none of the liquid in feed zone 14 can pass therefrom into the hollow interior of the permeation cells 16 except by permeating through the plastic permeation membrane 17 which forms two faces of each permeation cell. The permeation cells are alternately suspended from the bottom and the top of permeation vessel 13 so as to provide a tortuous path for the feed reactants through the permeation apparatus. The purpose of the tortuous path is to minimize backmixing of the more completely converted reaction mixture with the freshly introduced reactants or less completely converted reaction mixture.

Cation exchangers 18, which are in the acid or hydrogen state, are positioned between each of the permeation cells 16 to provide an acid condition conducive to rapid esterification. The cation exchange materials may be in sheet or granular form or suitably contained within a screen-type container such that the carboxylic acid and alcohol may contact the exchanger to speed up the esterification reaction. The use of the cation exchanger permits rapid esterification while eliminating the possible harm which a conventional acid esterification catalyst such as sulfuric acid might have upon the permeation membrane. Mild acid catalysts may be used in place of the cation exchanger if they do not cause serious damage to the permeation membrane, but it is preferred to use the cation exchanger or else no acid esterification catalyst whatever.

A permeation temperature of 100° to 200° C. is maintained within feed zone 14. This zone is maintained under a pressure sufficient to maintain water in the liquid phase at this temperature, e.g. a pressure of about 75 p.s.i.g. at 150° C. A lower pressure is maintained within the interior (permeate zone 19) of permeation cells 16. In this embodiment, atmospheric pressure is maintained within permeate zones 19. The permeation membrane 17 employed herein is a hydrolyzed polyvinyl acetate membrane, substantially all of the acetyl groups having been hydrolyzed therefrom, of about 1 mil thickness. As the esterification action proceeds, the water permeates membrane 17 and passes into the permeate zone 19. The water exists in permeate zone 19 in the vapor state and is removed from permeate zone 19 by means of connecting lines 21 which in turn connect with manifolding lines 22 which collect all of the water vapor from the permeate zones. The permeated water, which is essentially free of esters, acids and alcohols, is discarded. The carboxylic acid and alcohol reactants pass through the up and down tortuous path in permeation vessel 13 and esterification proceeds as it passes along the tortuous path. By the time the reaction mixture reaches the end of the permeation vessel which is opposite from the point where the reactants were introduced, esterification is substantially complete. The esters are then withdrawn by way of line 23 and passed to storage means not shown. All of the lauric acid is consumed during the reaction, and the non-permeated portion withdrawn by line 23 consists of isooctyl laurate, the excess isooctyl alcohol and less than about 0.5 weight percent water.

Referring now to Figure 2, permeation vessel 13 is depicted herein as being of square or rectangular cross section. It may be of circular or other shape if desired, since the shape has no bearing upon the operation of the permeation apparatus. The thickness of permeation vessel 13 is depicted herein by 24. Retaining ring 26 holds permeation membrane 17 in place within the permeation cell 16.

Figure 3 shows an enlarged cross section of permeation cell 16 which is taken along line 2—2' of Figure 2. Spacer ring 27 separates the two permeation membrances 17 which are positioned on opposite sides of spacer ring 27. Retaining rings 26 are of the same shape as spacer ring 27 and compress permeation membrane 17 against retaining ring 26 thereby forming a leak-proof permeation cell through which no material can pass except by permeation through membranes 17. A passageway 28 through the bottom of spacer ring 27 permits permeate vapors within permeate zone 19 to pass down through the passageway into connecting line 21 by which the vapors pass into manifolding line 22. When a large pressure differential is maintained between the feed zone and the permeate zone, a membrane supporting means may be placed within the permeate zone to provide support for the permeation membranes 17. This supporting means may take the form of a porous solid, screen or the like.

In the embodiment described herein the mixture of reactants and reaction products was maintained in the liquid state in the feed zone of the permeation apparatus, and the permeated portion was removed from the permeate zone in the vapor state. If desired, both of these zones may be maintained in the vapor state or both may be maintained in the liquid state. By maintaining the reaction mixture in the feed zone in the liquid state and maintaining the permeated portion thereof in the vapor state, the chemical reactions are more readily carried out and the permeation process functions more efficiently, and therefore this method of operation is preferred. The permeation temperature is preferably maintained as high as possible since the rate of permeation is higher at the higher permeation temperatures. Obviously the temperature within the permeation vessel should not be so high as to adversely affect the chemical reaction which is being carried out, nor should it be so high as to cause the membrane to be ruptured easily. The permeation membrane should be as thin as possible since the thinner the membrane the faster is the permeation rate. Suitable membrane thicknesses will usually be from 0.1 to 10 mils. Any water permeable plastic film which is free of pin holes, i.e. presents a continuous surface, may be used as the permeation membrane. Films comprised of regenerated cellulose, hydrolysed polyvinyl esters such as hydrolyzed polyvinyl acetate, cellulose acetate (partially esterified, e.g. having an acetyl content of 35 to 45% by weight), polyacrylonitrile, and the like may suitably be used. Although the embodiment shown in Figure 1 portrays a continuous permeation process, the esterification and permeation may be carried out in a batch operation. In such a modification the reactants are introduced into the feed zone and maintained therein, water being continuously removed as permeate vapors, until esterification is substantially complete. The esterification products which are free of water are then removed from the feed zone.

Example

Illustrative of the effectiveness of the invention is the following example. A mixture of 2.2 mols of n-butanol and 1 mol of glacial acetic acid (without any esterification catalyst) was introduced into the feed zone of a permeation apparatus. Esterification and permeation of the reaction products was continued for a period of about 60 hours (although the esterification reaction was substantially complete prior to the specified time). The feed zone was maintained in the liquid state and at a temperature of 155° C. The permeation membranes were comprised of hydrolyzed polyvinyl acetate of 1 mil thickness. The permeate zone was maintained at a pressure of 200 mm. Hg abs. and permeate vapors were continuously withdrawn in the batch permeation run which was carried out. After a 60 hour period, the non-permeated portion which remained was then analyzed and it was found that all of the acetic acid had been esterified. The non-permeated portion contained only 0.4 weight percent water. The permeated portion was also analyzed throughout the course of the permeation run and was found to contain at all times approximately 95% water.

When a comparative esterification was carried out without permeation, using the same mixture of reactants and esterification temperature, it was found that the equilibrium mixture after 60 hours contained 3.5 weight percent of unesterified acetic acid and 7.5 weight percent water. Thus, it is possible to obtain substantially complete esterification by the present invention and at the same time dehydrate the esters produced.

Not only may the present invention be applied during esterification processes, but it may also be used in carrying out other reactions between organic chemicals in which water is a product of equilibrium reaction. Thus, carboxylic acids may be esterified with mercaptans to produce thioesters and water, the latter being selectively permeated to drive the equilibrium reaction to completion. Acetal formation may be carried out in the feed zone of the permeation apparatus, i.e. the reaction between aldehydes and alcohols whereby an acetal and water are produced. Mercaptals and mercaptoles may be formed in the feed zone of the permeation apparatus by reacting aldehydes or ketones, respectively, with mercaptans. Oximes may be prepared by reacting organic carbonyl compounds with hydroxyl amines. For example aldehydes such as acetaldehyde may be reacted with hydroxyl amine to produce acetaldoxime and water; and ketones such as acetone may similarly be reacted with hydroxylamine to produce acetoxime and water. Selective permeation of water from the reaction mixture drives the equilibrium reaction to completion. The above chemical reactions are only examples of those equilibrium processes which produce water and which may advantageously be carried out in the feed zone of a permeation apparatus using a water permeable membrane which selectively removes the water during the course of the reaction, and such examples are not to be construed as limiting the scope of the invention thereto. Most effective results are obtained from the present invention when the organic reactants employed are oil-soluble and have very little if any solubility in water.

Thus having described the invention what is claimed is:

1. A method for driving to substantial completion equilibrium chemical reactions between organic chemical reactants in which water is a product of the reaction, which method comprises introducing liquid organic chemical reactants into the feed zone of a permeation apparatus and therein effecing reaction between the liquid reactants and producing a reaction product mixture including water, said permeation apparatus being comprised of a feed zone which is separated from a permeate zone by a thin water permeable plastic membrane, maintaining pressure in the feed zone sufficient to maintain the mixture in the liquid state, permeating water through said membrane into the permeate zone, vaporizing water in the permeate zone and withdrawing permeated water vapor from the permeate zone, continuing the reaction between the organic reactants whereby water is produced and continuing the permeation of the water through the membrane until the reaction between the reactants in the feed zone is substantially complete, and recovering non-permeated reaction products from the feed zone.

2. The method of claim 1 wherein the reactants are carboxylic acids and alcohols and an esterification reaction, in which carboxylic acid esters and water are reaction products, is carried out in the feed zone.

3. The method of claim 1 wherein the reactants are aldehydes and alcohols which are reacted in the feed zone to form acetals and water as reaction products.

4. The method of claim 1 wherein the reactants are aldehydes and hydroxyl amines which are reacted in the feed zone to form oximes and water as reaction products.

5. The method of claim 1 wherein the permeate zone is maintained at pressure sufficiently lower than the pressure maintained in the feed zone so that the water permeating into the permeate zone is vaporized and removed as vapor from the permeate zone.

6. The method of claim 1 wherein the permeation membrane is comprised of a water-soluble cellulose derivative.

7. The method of claim 1 wherein the permeation membrane is comprised of a hydrolyzed polyvinyl ester.

8. The method of claim 1 wherein the chemical reaction is esterification which is facilitated by the presence of a cation exchange resin in the acid state which is positioned in the feed zone of the permeation apparatus.

9. The method of claim 1 wherein organic chemical reactants are oil-soluble.

References Cited in the file of this patent

UNITED STATES PATENTS

| | | |
|---|---|---|
| 2,386,826 | Wallach et al. | Oct. 16, 1945 |
| 2,734,015 | Wettstein et al. | Feb. 7, 1956 |
| 2,766,273 | Bruins et al. | Oct. 9, 1956 |

OTHER REFERENCES

Groggings: Unit Processes in Organic Synthesis, fourth edition 1952, pp. 609 to 610, published by McGraw-Hill Book Co. Inc., New York.